(12) United States Patent
Wietfeldt et al.

(10) Patent No.: US 9,433,003 B2
(45) Date of Patent: Aug. 30, 2016

(54) MULTI-RADIO COEXISTENCE VIA TIMING CONTROLS FOR RADIOS USING THE SAME RADIO ACCESS TECHNOLOGY

(71) Applicant: QUALCOMM Incorporated, San Diego, CA (US)

(72) Inventors: Richard Dominic Wietfeldt, San Diego, CA (US); George Chrisikos, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 65 days.

(21) Appl. No.: 13/743,260

(22) Filed: Jan. 16, 2013

(65) Prior Publication Data

US 2013/0235814 A1    Sep. 12, 2013

Related U.S. Application Data

(60) Provisional application No. 61/607,816, filed on Mar. 7, 2012.

(51) Int. Cl.

| | |
|---|---|
| *H04W 72/12* | (2009.01) |
| *H04W 88/04* | (2009.01) |
| *H04W 88/06* | (2009.01) |
| *H04W 72/08* | (2009.01) |
| *H04W 16/14* | (2009.01) |

(52) U.S. Cl.
CPC ........... *H04W 72/082* (2013.01); *H04W 16/14* (2013.01); *H04W 72/1231* (2013.01); *H04W 72/1215* (2013.01); *H04W 88/04* (2013.01); *H04W 88/06* (2013.01)

(58) Field of Classification Search
USPC ....... 370/252, 278, 311, 328, 329, 330, 336, 370/338; 455/63.1, 78, 114.2, 436, 450, 455/451, 452.1, 454, 552.1, 553.1, 501; 375/141, 148, 219, 267, 350; 235/462.43
See application file for complete search history.

(56) References Cited

U.S. PATENT DOCUMENTS

| | | | | |
|---|---|---|---|---|
| 7,299,005 | B1 * | 11/2007 | Yarkosky et al. | ................. 455/7 |
| 7,941,178 | B2 | 5/2011 | Guo et al. | |
| 7,949,364 | B2 * | 5/2011 | Kasslin et al. | ............. 455/552.1 |

(Continued)

FOREIGN PATENT DOCUMENTS

| | | |
|---|---|---|
| EP | 1220460 A2 | 7/2002 |
| EP | 2146541 A1 * | 1/2010 ............ H04W 48/18 |

(Continued)

OTHER PUBLICATIONS

Berlemann et al., Coexistence and Interworking of IEEE 802.16 and IEEE 802.11(e), IEEE Vehicular Technology Conference, 2006. VTC 2006-Spring. IEEE 63rd, vol. 1, pp. 27-31, May 7-10, 2006.*

(Continued)

*Primary Examiner* — Benjamin H Elliott, IV
*Assistant Examiner* — Eric Nowlin
(74) *Attorney, Agent, or Firm* — Seyfarth Shaw LLP

(57) ABSTRACT

A method of wireless communication includes identifying a first radio operating in a first mode and a second radio operating in a second mode defined within one device. The first radio and the second radio operate on a same radio access technology (RAT) and also operate on a same band. The method also includes altering a communication time of the first radio and/or the second radio to reduce interference.

16 Claims, 16 Drawing Sheets

(56) References Cited

U.S. PATENT DOCUMENTS

| | | | |
|---|---|---|---|
| 8,131,209 B1* | 3/2012 | Chen et al. | 455/11.1 |
| 8,155,695 B2 | 4/2012 | Wang et al. | |
| 8,200,161 B2 | 6/2012 | Walley et al. | |
| 8,537,724 B2* | 9/2013 | Love et al. | 370/280 |
| 8,559,383 B2* | 10/2013 | Zetterman et al. | 370/329 |
| 8,559,961 B2* | 10/2013 | Boudreau et al. | 455/447 |
| 8,805,303 B2* | 8/2014 | Koo et al. | 455/114.2 |
| 8,831,611 B2* | 9/2014 | Koo et al. | 455/436 |
| 8,848,596 B2* | 9/2014 | Shin et al. | 370/315 |
| 8,953,476 B2* | 2/2015 | Zhao et al. | 370/252 |
| 2004/0127191 A1 | 7/2004 | Matsunaga | |
| 2004/0160908 A1* | 8/2004 | Perlman | H04W 88/04 370/328 |
| 2006/0084383 A1* | 4/2006 | Ibrahim et al. | 455/41.2 |
| 2006/0135076 A1* | 6/2006 | Honkanen et al. | 455/67.13 |
| 2006/0217071 A1 | 9/2006 | Russo et al. | |
| 2007/0080781 A1* | 4/2007 | Ginzburg et al. | 340/7.21 |
| 2007/0099567 A1* | 5/2007 | Chen et al. | 455/41.2 |
| 2008/0045152 A1 | 2/2008 | Boes | |
| 2008/0057967 A1 | 3/2008 | Goldsmith | |
| 2008/0240021 A1 | 10/2008 | Guo et al. | |
| 2009/0086712 A1* | 4/2009 | Liu et al. | 370/350 |
| 2009/0176454 A1* | 7/2009 | Chen et al. | 455/63.1 |
| 2009/0180451 A1* | 7/2009 | Alpert et al. | 370/338 |
| 2009/0264077 A1* | 10/2009 | Damnjanovic | 455/63.1 |
| 2010/0029215 A1* | 2/2010 | Honkanen et al. | 455/63.3 |
| 2010/0219250 A1* | 9/2010 | Wang | 235/462.43 |
| 2010/0309825 A1* | 12/2010 | Zhang | 370/278 |
| 2010/0322287 A1 | 12/2010 | Truong et al. | |
| 2011/0038311 A1* | 2/2011 | Marin et al. | 370/328 |
| 2011/0044218 A1 | 2/2011 | Kaur et al. | |
| 2011/0149764 A1* | 6/2011 | Wietfeldt et al. | 370/252 |
| 2011/0243047 A1 | 10/2011 | Dayal et al. | |
| 2011/0312288 A1* | 12/2011 | Fu et al. | 455/88 |
| 2012/0020231 A1 | 1/2012 | Chen et al. | |
| 2012/0069766 A1 | 3/2012 | Fu et al. | |
| 2012/0082140 A1* | 4/2012 | Lin et al. | 370/336 |
| 2012/0164948 A1* | 6/2012 | Narasimha et al. | 455/63.1 |
| 2012/0170557 A1* | 7/2012 | Tsfati et al. | 370/338 |
| 2012/0195298 A1 | 8/2012 | Kuo | |
| 2012/0207040 A1* | 8/2012 | Comsa et al. | 370/252 |
| 2013/0029704 A1 | 1/2013 | Koo et al. | |
| 2013/0107792 A1* | 5/2013 | Lam | H04W 84/18 370/315 |
| 2013/0114583 A1 | 5/2013 | Park et al. | |
| 2013/0155931 A1* | 6/2013 | Prajapati | H04W 72/044 370/311 |
| 2014/0050146 A1 | 2/2014 | Chrisikos et al. | |
| 2014/0213310 A1* | 7/2014 | Yeh et al. | 455/501 |

FOREIGN PATENT DOCUMENTS

| | | |
|---|---|---|
| WO | 2010025678 A1 | 3/2010 |
| WO | 2011054372 A1 | 5/2011 |
| WO | WO 2011054372 A1 * | 5/2011 |
| WO | 2012021879 A2 | 2/2012 |
| WO | 2012064093 A2 | 5/2012 |

OTHER PUBLICATIONS

International Search Report and Written Opinion—PCT/US2013/021990—ISA/EPO—Jun. 20, 2013.

Kishida A. et al., "A Novel Interference Avoidance Technique on Mobile Wireless Routers Using IEEE802.11n PSMP," IEICE Transactions on Communications, Aug. 1, 2010 Communications Society, Tokyo, JP, vol. E93B, No. 8, Aug. 1, 2010, pp. 2053-2062, XP001558602, ISSN 0916-8516, Doi: 10.1587/Transcom.E93.B.2053.

* cited by examiner

MULTI-RADIO COEXISTENCE VIA TIMING CONTROLS FOR RADIOS USING THE SAME RADIO ACCESS TECHNOLOGY

CROSS-REFERENCE TO RELATED APPLICATION

This application claims the benefit under 35 U.S.C. §119(e) to U.S. Provisional Patent Application No. 61/607,816 entitled "MULTI-RADIO COEXISTENCE," filed on Mar. 7, 2012, the disclosure of which is expressly incorporated by reference herein in its entirety.

TECHNICAL FIELD

The present description is related, generally, to multi-radio techniques and, more specifically, to coexistence techniques for multi-radio devices.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a Global Positioning System (GPS) radio, and a Bluetooth radio, where two of the above or all four may operate simultaneously. While the different radios provide useful functionalities for the mobile device, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith. It is noted that Bluetooth and Wireless LAN (WLAN) channels fall within the ISM band. In some instances, a Bluetooth or WLAN error rate can become unacceptable when LTE is active in some channels of Band 7 and Band 40 for some Bluetooth or WLAN channel conditions. In some cases, the simultaneous operation of LTE with Bluetooth can result in disruption in voice services terminating in a Bluetooth headset. Additionally, LTE can be disrupted by WLAN and, or BT transmissions. Such disruption may be unacceptable to the consumer. A similar issue exists when LTE transmissions interfere with GPS.

With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher than reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports to make handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

SUMMARY

According to an aspect of the present disclosure, a method for wireless communication is presented. The method includes identifying a first radio operating in a first mode and a second radio operating in a second mode defined within one device. The method also includes altering a communication time of the first radio and/or the second radio to reduce interference.

According to another aspect of the present disclosure, an apparatus for wireless communications is presented. The apparatus includes means for identifying a first radio operating in an first mode and a second radio operating in a second mode defined within one device. The apparatus also includes means altering a communication time of the first radio and/or the second radio to reduce interference.

According to still another aspect of the present disclosure, a computer program product for wireless communications is presented. The computer program product includes a non-transitory computer-readable medium having program code recorded thereon. The program code includes program code to identify a first radio operating in an first mode and a second radio operating in a second mode defined within one device. The program code also includes program code to alter a communication time of the first radio and/or the second radio to reduce interference.

An apparatus for wireless communications is presented. The apparatus includes a memory and a processor(s) coupled to the memory. The processor is configured to identify a first radio operating in an first mode and a second radio operating in a second mode defined within one device. The processor is also configured to alter a communication time of the first radio and/or the second radio to reduce interference.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
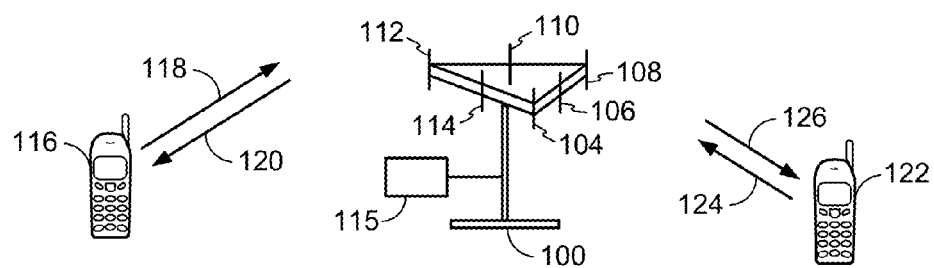
FIG. 1 illustrates a multiple access wireless communication system according to one aspect.

Various aspects of the disclosure provide techniques to mitigate coexistence issues in multi-radio devices, where significant in-device coexistence problems can exist between, e.g., the LTE and Industrial Scientific and Medical (ISM) bands (e.g., for BT/WLAN). As explained above, some coexistence issues persist because an eNB is not aware of interference on the UE side that is experienced by other radios. According to one aspect, the UE declares a Radio Link Failure (RLF) and autonomously accesses a new channel or Radio Access Technology (RAT) if there is a coexistence issue on the present channel. The UE can declare a RLF in some examples for the following reasons: 1) UE reception is affected by interference due to coexistence, and 2) the UE transmitter is causing disruptive interference to another radio. The UE then sends a message indicating the coexistence issue to the eNB while reestablishing connection in the new channel or RAT. The eNB becomes aware of the coexistence issue by virtue of having received the message.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3$^{rd}$ Generation Partnership Project" (3GPP). CDMA2000 is described in documents from an organization named "3$^{rd}$ Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Referring to FIG. 1, a multiple access wireless communication system according to one aspect is illustrated. An evolved Node B 100 (eNB) includes a computer 115 that has processing resources and memory resources to manage the LTE communications by allocating resources and parameters, granting/denying requests from user equipment, and/or the like. The eNB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over an uplink (UL) 188. The UE 122 is in communication with antennas 106 and 108, while antennas 106 and 108 transmit information to the UE 122 over a downlink (DL) 126 and receive information from the UE 122 over an uplink 124. In a frequency division duplex (FDD) system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNB. In this aspect, respective antenna groups are designed to communicate to UEs in a sector of the areas covered by the eNB 100.

In communication over the downlinks 120 and 126, the transmitting antennas of the eNB 100 utilize beamforming to improve the signal-to-noise ratio of the uplinks for the different UEs 116 and 122. Also, an eNB using beamforming to transmit to UEs scattered randomly through its coverage causes less interference to UEs in neighboring cells than a UE transmitting through a single antenna to all its UEs.

An eNB can be a fixed station used for communicating with the terminals and can also be referred to as an access point, base station, or some other terminology. A UE can also be called an access terminal, a wireless communication device, terminal, or some other terminology.

Figure 2:
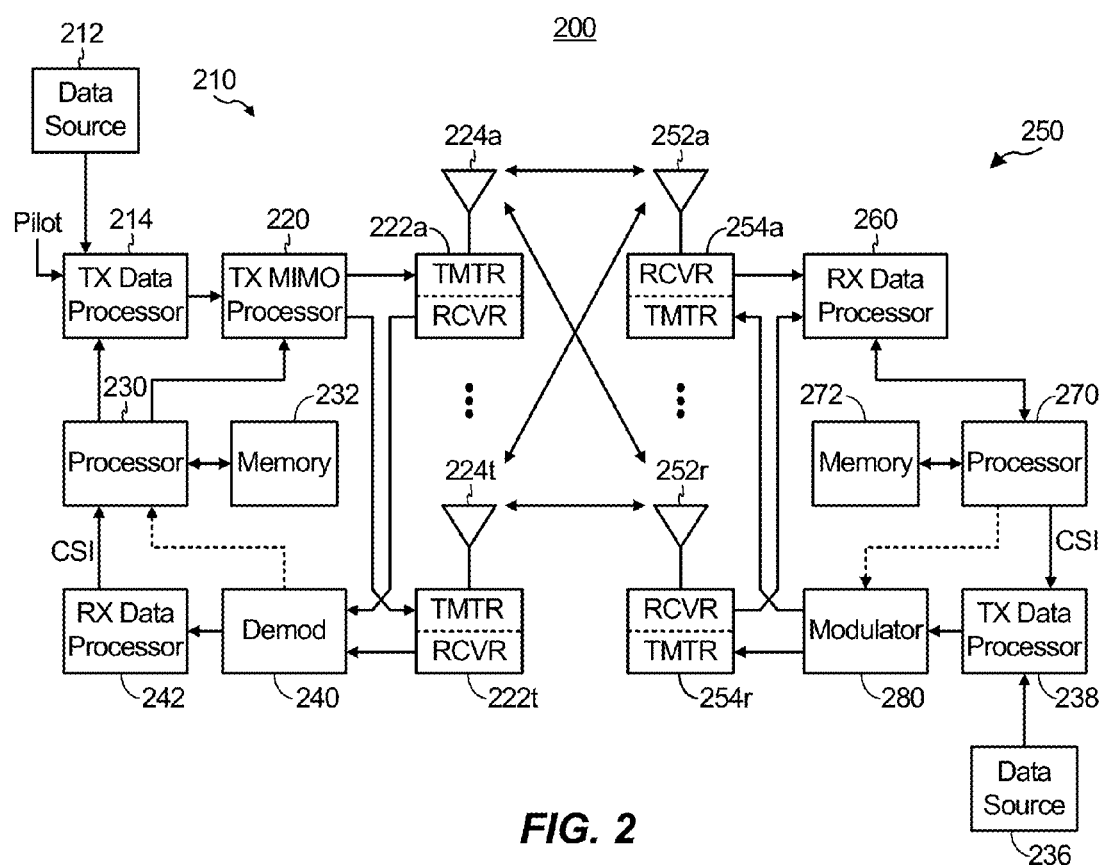
FIG. 2 is a block diagram of a communication system according to one aspect.

FIG. 2 is a block diagram of an aspect of a transmitter system 210 (also known as an eNB) and a receiver system 250 (also known as a UE) in a MIMO system 200. In some instances, both a UE and an eNB each have a transceiver that includes a transmitter system and a receiver system. At the transmitter system 210, traffic data for a number of data streams is provided from a data source 212 to a transmit (TX) data processor 214.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, wherein $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNB to extract transmit beamforming gain on the downlink when multiple antennas are available at the eNB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides $N_T$ modulation symbol streams to $N_T$ transmitters (TMTR) 222a through 222t. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At a receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_R$ "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by transmitters 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
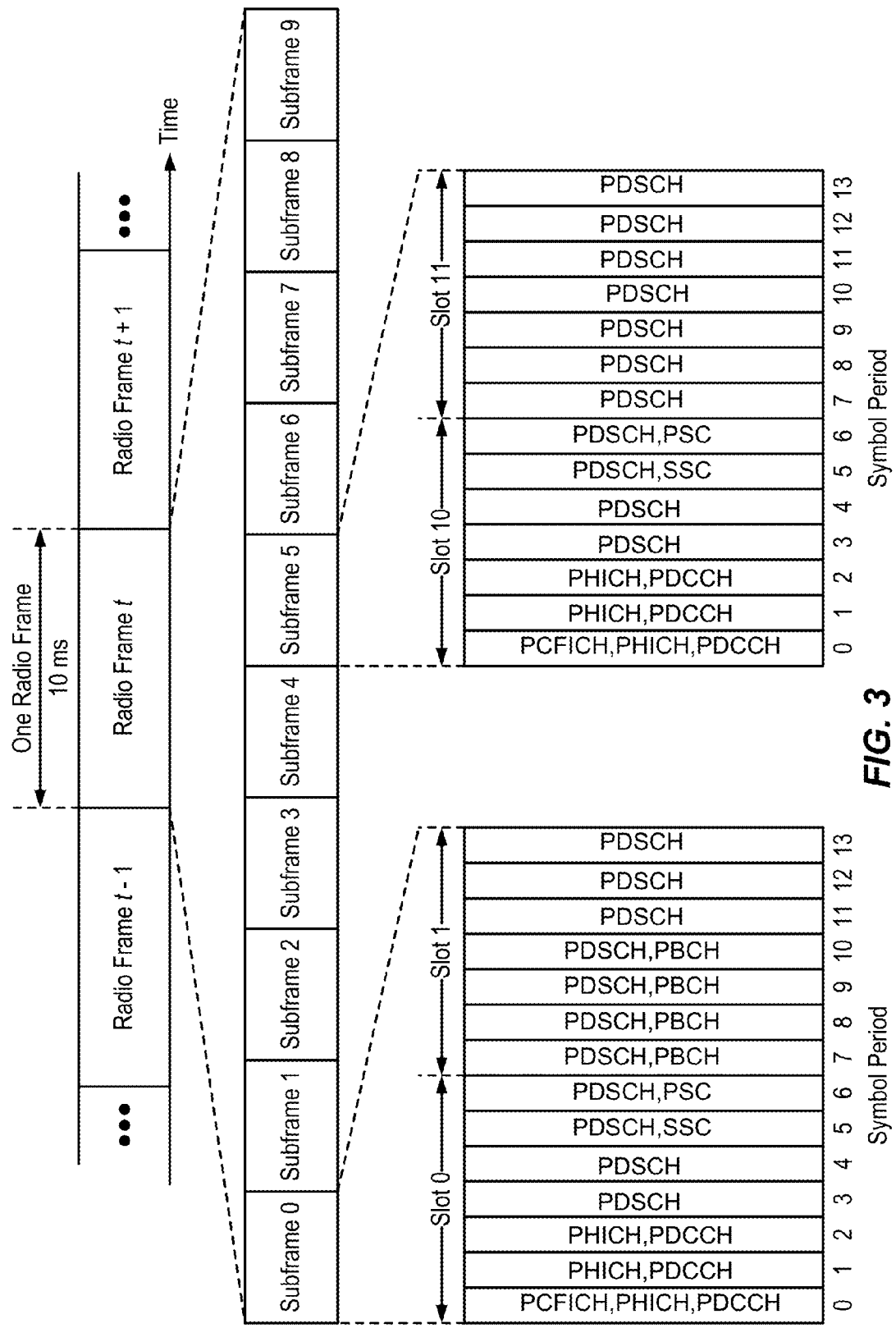
FIG. 3 illustrates an exemplary frame structure in downlink Long Term Evolution (LTE) communications.

FIG. 3 is a block diagram conceptually illustrating an exemplary frame structure in downlink Long Term Evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
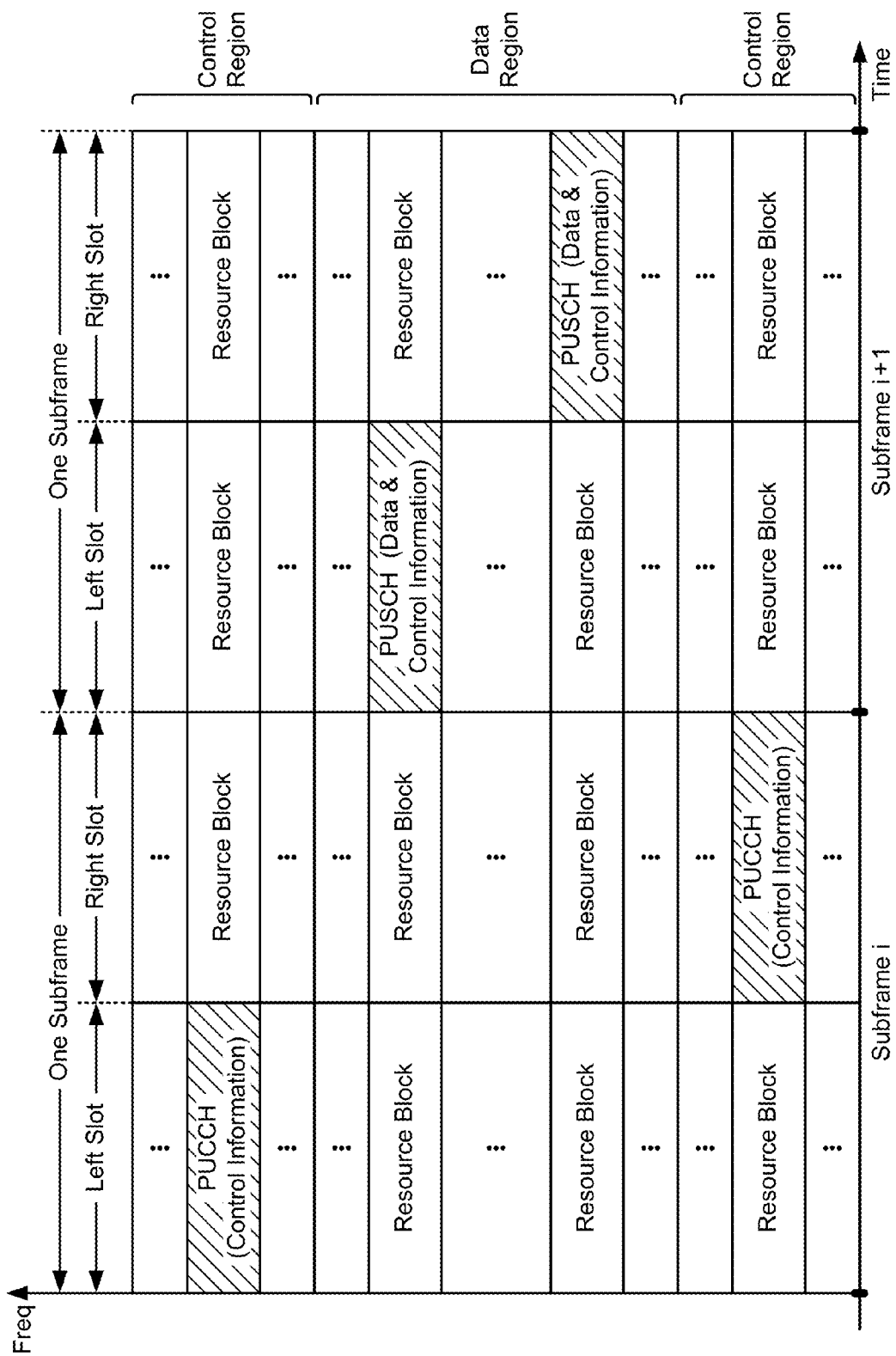
FIG. 4 is a block diagram conceptually illustrating an exemplary frame structure in uplink Long Term Evolution (LTE) communications.

FIG. 4 is a block diagram conceptually illustrating an exemplary frame structure in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
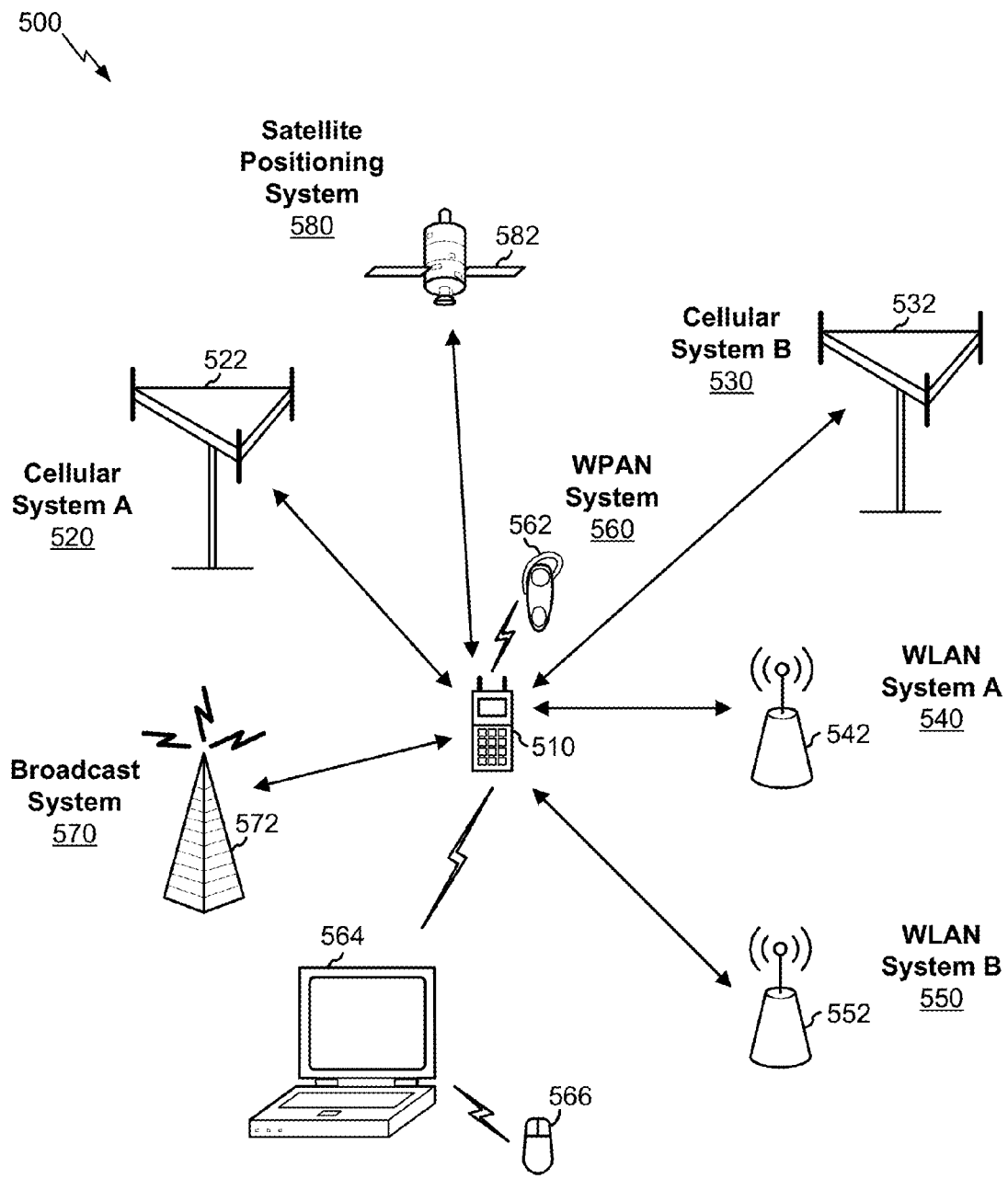
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC-FDMA), or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1x), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3$^{rd}$ Generation Partnership Project" (3GPP). cdma2000 and UMB are described in documents from an organization named "3$^{rd}$ Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (WiFi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices(s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (CxM, not shown) that has a functional module to detect and mitigate coexistence issues, as explained further below.

Figure 6:
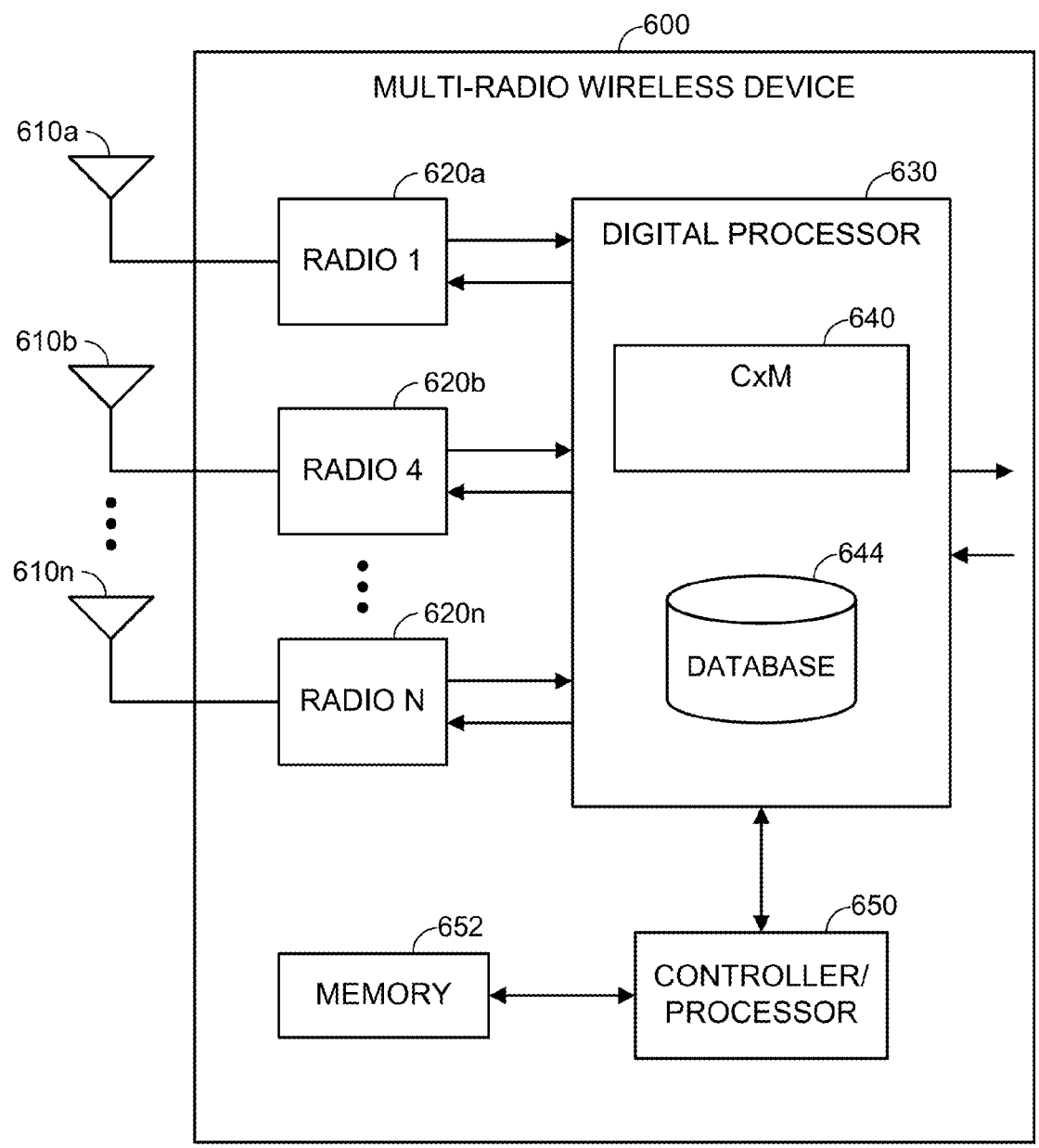
FIG. 6 is a block diagram of an example design for a multi-radio wireless device.

Turning next to FIG. 6, a block diagram is provided that illustrates an example design for a multi-radio wireless device 600 and may be used as an implementation of the radio 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a coexistence manager (CxM) 640 that can control operation of the radios 620 in order to improve the performance of the wireless device 600 as generally described herein. The coexistence manager 640 can have access to a database 644, which can store information used to control the operation of the radios 620. As explained further below, the coexistence manager 640 can be adapted for a variety of techniques to decrease interference between the radios. In one example, the coexistence manager 640 requests a measurement gap pattern or DRX cycle that allows an ISM radio to communicate during periods of LTE inactivity.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

Figure 7:
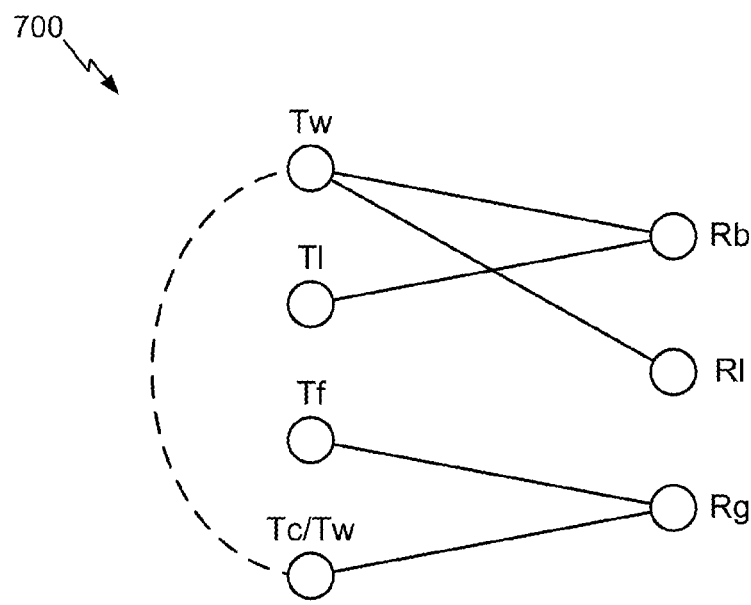
FIG. 7 is graph showing respective potential collisions between seven example radios in a given decision period.
Figure 19:
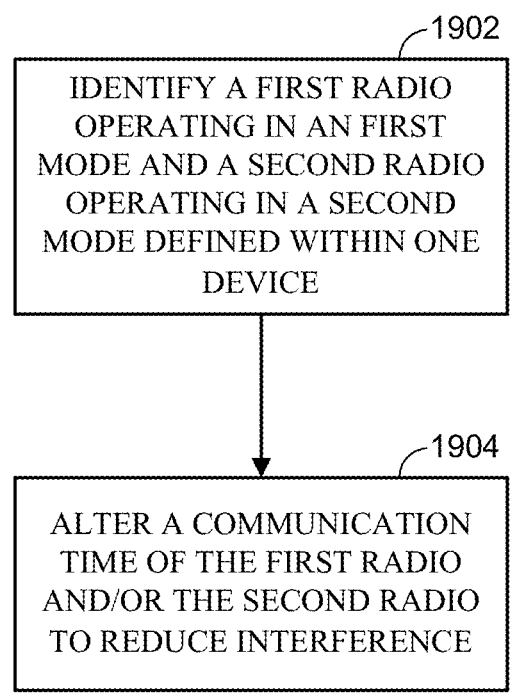
FIG. 19 is a block diagram illustrating a method for mitigating interference according to one aspect of the present disclosure.

In an aspect, the coexistence manager 640 can manage operation of respective radios 620 utilized by wireless device 600 in order to avoid interference and/or other performance degradation associated with collisions between respective radios 620. coexistence manager 640 may perform one or more processes, such as those illustrated in FIG. 19. By way of further illustration, a graph 700 in FIG. 7 represents respective potential collisions between seven example radios in a given decision period. In the example shown in graph 700, the seven radios include a WLAN transmitter (Tw), an LTE transmitter (Tl), an FM transmitter (Tf), a GSM/WCDMA transmitter (Tc/Tw), an LTE receiver (Rl), a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (Tl) and the Bluetooth receiver (Rb); (3) the WLAN transmitter (Tw) and the LTE receiver (Rl); (4) the FM transmitter (Tf) and the GPS receiver (Rg); (5) a WLAN transmitter (Tw), a GSM/WCDMA transmitter (Tc/Tw), and a GPS receiver (Rg).

Figure 8:
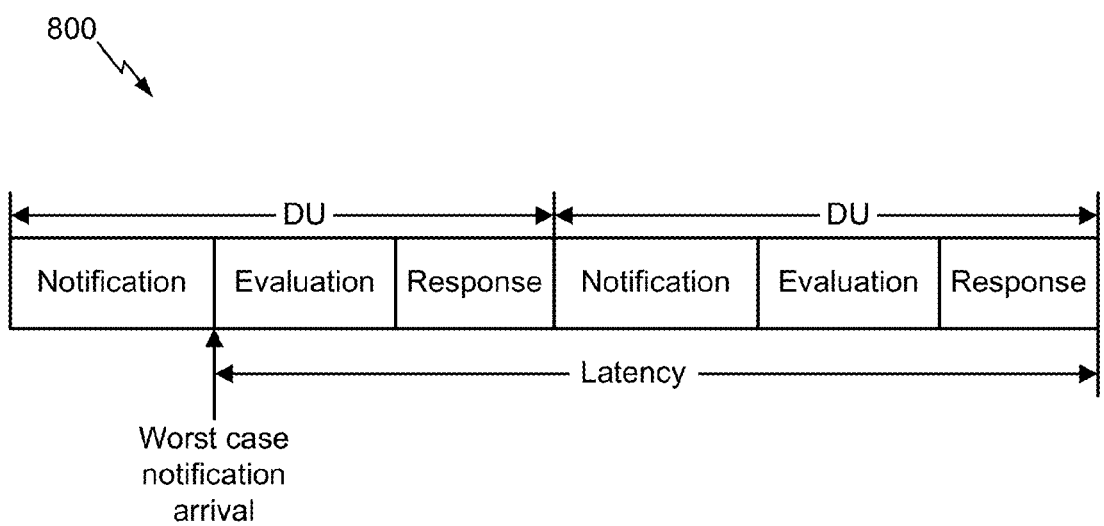
FIG. 8 is a diagram showing operation of an example Coexistence Manager (CxM) over time.

In one aspect, an example coexistence manager 640 can operate in time in a manner such as that shown by diagram 800 in FIG. 8. As diagram 800 illustrates, a timeline for coexistence manager operation can be divided into Decision Units (DUs), which can be any suitable uniform or non-uniform length (e.g., 100 μs) where notifications are processed, and a response phase (e.g., 20 μs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

Figure 9:
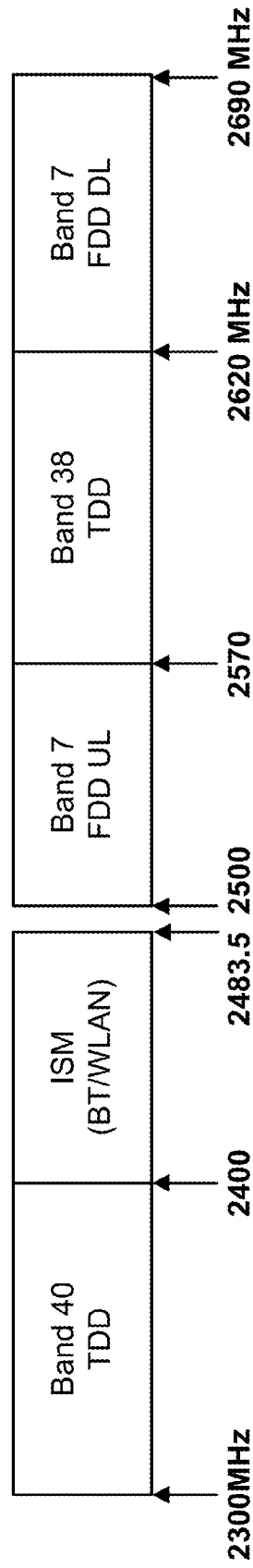
FIG. 9 is a block diagram illustrating adjacent frequency bands.

As shown in FIG. 9, Long Term Evolution (LTE) in band 7 (for frequency division duplex (FDD) uplink), band 40 (for time division duplex (TDD) communication), and band 38 (for TDD downlink) is adjacent to the 2.4 GHz Industrial Scientific and Medical (ISM) band used by Bluetooth (BT) and Wireless Local Area Network (WLAN) technologies. Frequency planning for these bands is such that there is limited or no guard band permitting traditional filtering solutions to avoid interference at adjacent frequencies. For example, a 20 MHz guard band exists between ISM and band 7, but no guard band exists between ISM and band 40.

To be compliant with appropriate standards, communication devices operating over a particular band are to be operable over the entire specified frequency range. For example, in order to be LTE compliant, a mobile station/user equipment should be able to communicate across the entirety of both band 40 (2300-2400 MHz) and band 7 (2500-2570 MHz) as defined by the 3rd Generation Partnership Project (3GPP). Without a sufficient guard band, devices employ filters that overlap into other bands causing band interference. Because band 40 filters are 100 MHz wide to cover the entire band, the rollover from those filters crosses over into the ISM band causing interference. Similarly, ISM devices that use the entirety of the ISM band (e.g., from 2401 through approximately 2480 MHz) will employ filters that rollover into the neighboring band 40 and band 7 and may cause interference.

In-device coexistence problems can exist with respect to a UE between resources such as, for example, LTE and ISM bands (e.g., for Bluetooth/WLAN). In current LTE implementations, any interference issues to LTE are reflected in the downlink measurements (e.g., Reference Signal Received Quality (RSRQ) metrics, etc.) reported by a UE and/or the downlink error rate which the eNB can use to make inter-frequency or inter-RAT handoff decisions to, e.g., move LTE to a channel or RAT with no coexistence issues. However, it can be appreciated that these existing techniques will not work if, for example, the LTE uplink is causing interference to Bluetooth/WLAN but the LTE downlink does not see any interference from Bluetooth/WLAN. More particularly, even if the UE autonomously moves itself to another channel on the uplink, the eNB can in some cases handover the UE back to the problematic channel for load balancing purposes. In any case, it can be appreciated that existing techniques do not facilitate use of the bandwidth of the problematic channel in the most efficient way.

Figure 10:
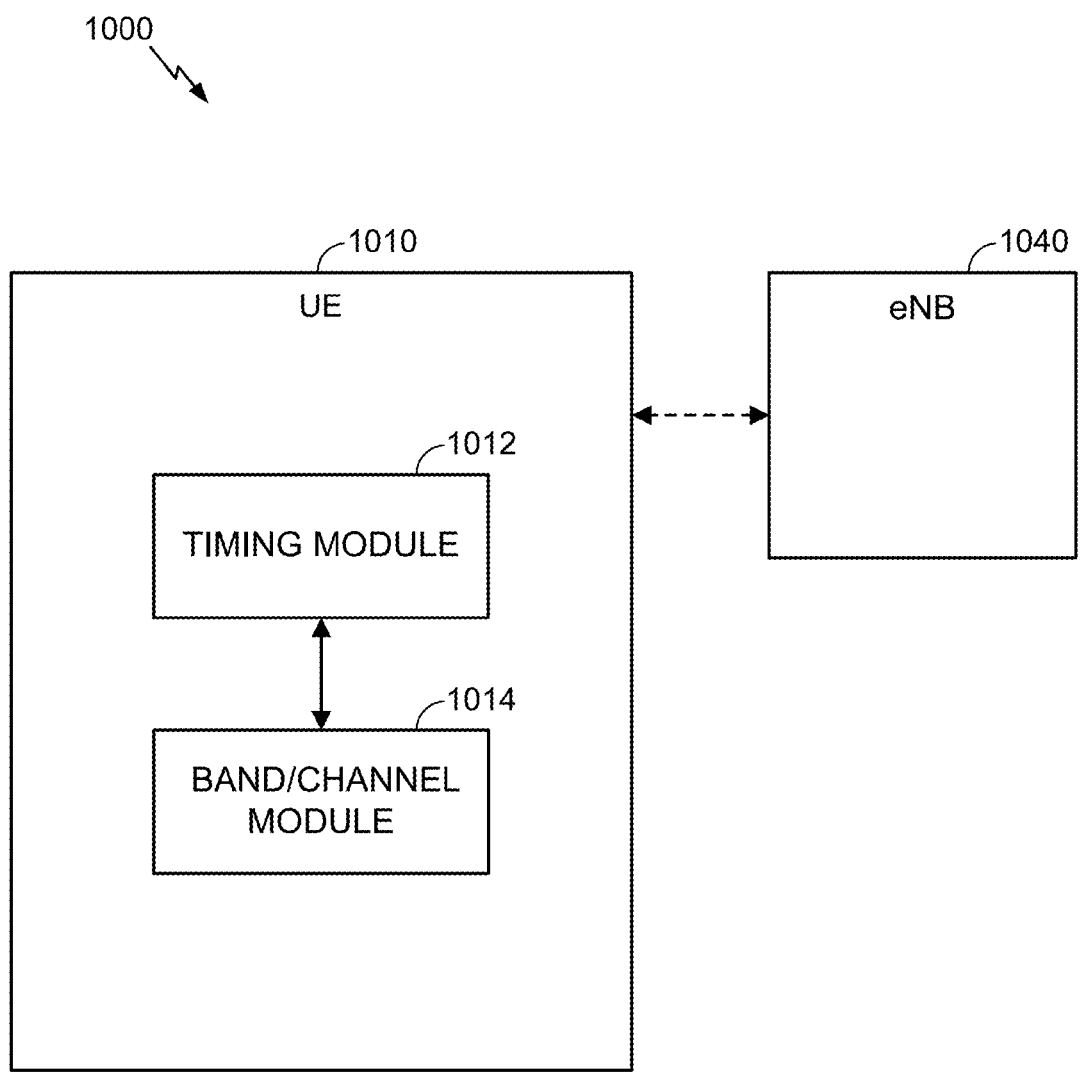
FIG. 10 is a block diagram of a system for providing support within a wireless communication environment for multi-radio coexistence management according to one aspect of the present disclosure.

Turning now to FIG. 10, a block diagram of a system 1000 for providing support within a wireless communication environment for multi-radio coexistence management is illustrated. The system 1000 can include one or more UEs 1010 and/or eNBs 1040, which can engage in uplink and/or downlink communications, and/or any other suitable communication with each other and/or any other entities in the system 1000. In one example, the UE 1010 and/or eNB 1040 may communicate using a variety resources, including frequency channels and sub-bands, some of which may potentially collide with other radio resources (e.g., a broadband radio such as an LTE modem). In some cases, the system may also include access points and/or external wireless devices (not shown). As generally described herein, the UE 1010 may specify various techniques for managing coexistence between multiple radios used by the UE 1010.

To mitigate potential interference, the UE 1010 may use respective features described herein and illustrated by the system 1000 to facilitate support for multi-radio coexistence within the UE 1010. For example, a timing module 1012 and a band/channel module 1014 can be provided. The various modules 1012, 1014 may, in some configurations, be implemented as part of a coexistence manager such as the coexistence manager 640 of FIG. 6. The various modules 1012, 1014 and others may be configured to implement the aspects discussed herein.

When communications of one or more radios of the same or different radio access technology (RAT) in the same or proximate communication spectrum are operating at the same time, potential interference between the radios may occur. It should be noted that in the present disclosure, a RAT may refer to any type of communications radio, such as a WLAN radio or a Bluetooth radio, and is not limited to a cellular radio. For example, if one RAT is attempting to receive communications while another RAT is transmitting, and both RATs are using the same or proximate portions of a communication spectrum, the receiving RAT may experience interference. That is, potential interference between RATs may occur when two RATs are operating on the same channel or adjacent channels so that a transmission time of one RAT overlaps a reception time of another RAT.

In one configuration, a radio of a first RAT type, such as a wireless local area network (WLAN) radio may operate concurrently in both an access point (AP) mode and a station (STA) mode. In some cases, potential interference with a radio of a different RAT type, such as an LTE radio, may occur when the WLAN radio is operating concurrently in the AP mode and the STA mode. When operating in the AP mode, the mobile device may be referred to as mobile WiFi (MiFi) hotspot.

Figure 11A:
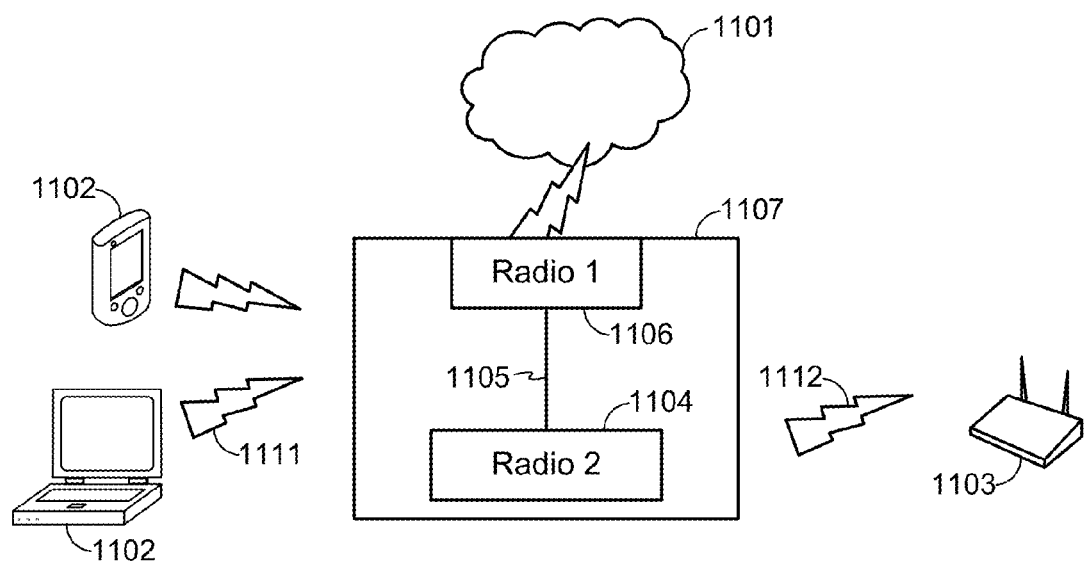
FIGS. 11A and 11B illustrate examples of a system for providing support within a wireless communication environment for multi-radio coexistence management according to one aspect of the present disclosure.

FIG. 11A illustrates an example of a device including a radio, such as a WLAN radio, that may operate concurrently in both an access point mode and a station mode. As illustrated in FIG. 11A, a device 1107 may include a first radio 1106, such as a wireless wide area network (WWAN) radio, for communicating with a first network 1101, such as a cellular network (3GPP, 3GPP2). The device may also include a second radio 1104, such a WLAN radio (WL), that may operate concurrently in both an access point mode and a station mode. When in the access point mode, the second radio 1104 may service access clients 1102 on a first link 1111. Additionally, when in the station mode, the second radio 1104 may provide a connection with a remote access point 1103 via a second link 1112. The device may also include a coexistence manager interface (CxMi) 1105 to facilitate communication between the first radio 1106 and the second radio 1104. In one aspect, the first radio and second radio may be operating in the same end-to-end communication link. For example, data from the network 1101 may be obtained by the device 1107 through the first radio 1106 and passed to device 1102 through the second radio 1104. Interference between those radios may be managed as discussed herein.

In one configuration, a device, such as a UE, may use more than one radio of the same RAT, such as two WLAN radios, that may operate independently of each other. Each radio may operate in two modes, such as, for example, an access point mode and a station mode. In each mode, the radio may transmit signals to another device (e.g. device or AP) or receive signals from another device. Thus, a given radio may have two separate transmissions and two separate receptions in a time-division multiplexed (TDM) fashion as determined by a control entity, such as a coexistence manager. That is, the radio may transmit and receive while in an access point mode and may have different transmissions and receptions while in the station mode. Similarly, another radio, such as a WLAN radio, on the same device may also operate, with time-division multiplexing and other coexistence coordination performed by a coexistence manager to coordinate operation with other radios in the device. In another configuration, the UE may include yet another radio that is of a different RAT, such as an LTE radio.

In some configurations, a first radio, such as a first WLAN radio, may operate in an access point mode and a second radio, such as a second WLAN radio, may operate concurrently and independently in a station mode. In this configuration, potential interference may occur when the two radios are operating concurrently and independently in various modes. For example, if the first radio is operating in an access point mode and the second radio is operating in the station mode, a transmission from the first radio may potentially interfere with a reception of the second radio when a time slot for the transmission and the reception overlap.

Figure 11B:
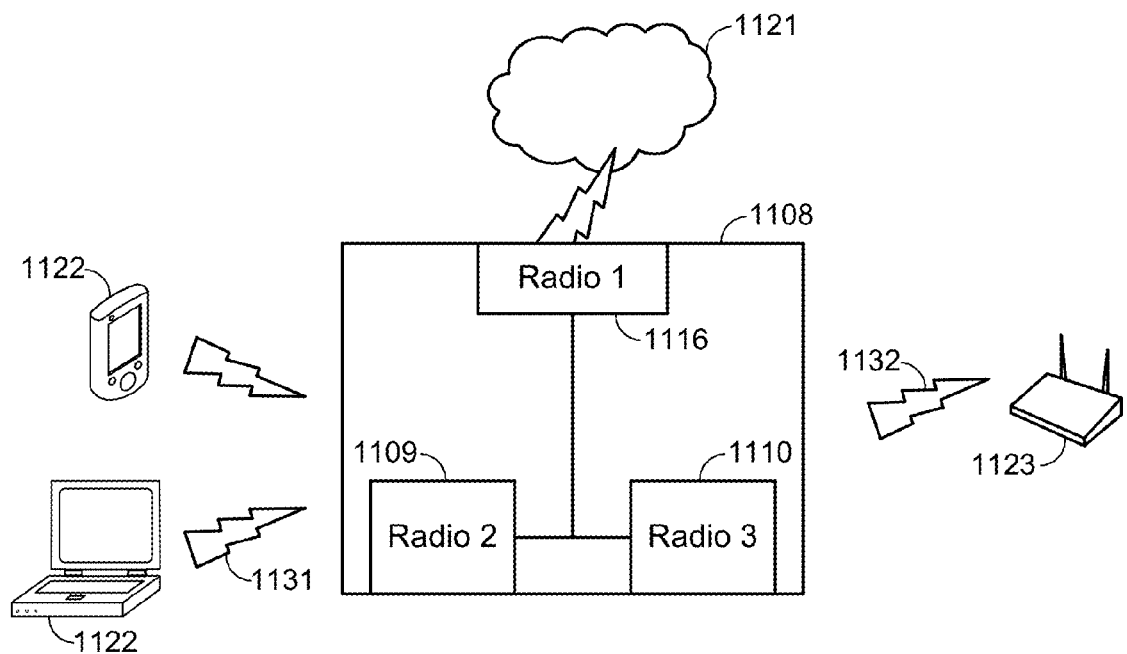

FIG. 11B illustrates an example of a device 1108 using two radios, such as two WLAN radios, that may operate concurrently in both an access point mode and a station mode. As illustrated in FIG. 11B, a device 1108 may include a first radio 1116, such as a wireless wide area network (WWAN) radio, for communicating with a first network 1121, such as a cellular network (3GPP, 3GPP2). The device may also include a second radio 1109, such as a WLAN radio, that may operate in an access point mode and a third radio 1110, such as WLAN radio, that may operate in a station mode. The second radio 1109 may service access clients 1122 on a first link 1131. Additionally, the third radio 1110 may provide a connection with a remote access point 1123 via a second link 1132. In the present configuration, the second radio 1109 and third radio 1110 use the same RAT. Additionally, the RAT of the second radio 1109 and third radio 1110 may be different from the RAT of the first radio 1106. The device 1108 may also include a coexistence manager interface 1125 to facilitate communication between the first radio 1106, the second radio 1109, and the third radio 1110. In one aspect, different radios may be operating in the same end-to-end communication link. For example, data may be obtained by the device 1107 through the one radio acting as an access point and passed to another radio acting as a station. Interference between those radios may be managed as discussed herein.

Figure 12A:
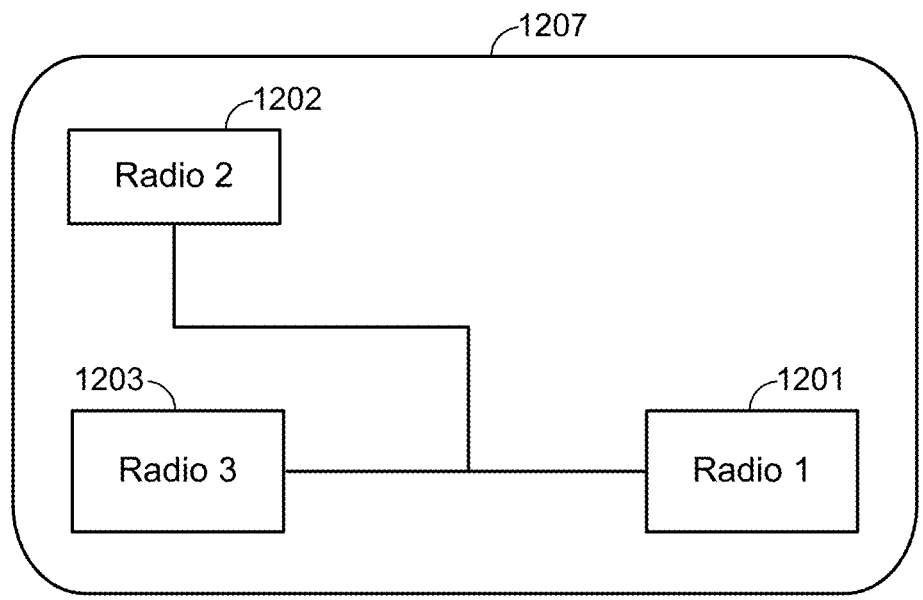
FIGS. 12A and 12B illustrate examples a multi-radio wireless device according to one aspect of the present disclosure.

FIG. 12A illustrates one example of a device with two radios using the same RAT. As illustrated in FIG. 12A the device 1207 may include a first radio 1201, such as a modem, for cellular communication on a first network, such as a 2G, 3G, or LTE. The first radio 1201 may also include a global positioning system (GPS) radio or other radio. Additionally, the device 1207 may include a second radio 1202, such as a WLAN radio, and a third radio 1203, such as a WLAN radio. In one configuration, the second radio 1202 and third radio 1203 have the same RAT. Additionally, the RAT for the second radio 1202 and third radio 1203 may be different from the RAT of the first radio 1201. In some cases, the third radio 1203 may also include a Bluetooth (BT) radio. The second radio 1202 and the third radio 1203 may operate on different frequencies, and therefore, the device may be referred to a dual-band device.

Figure 12B:
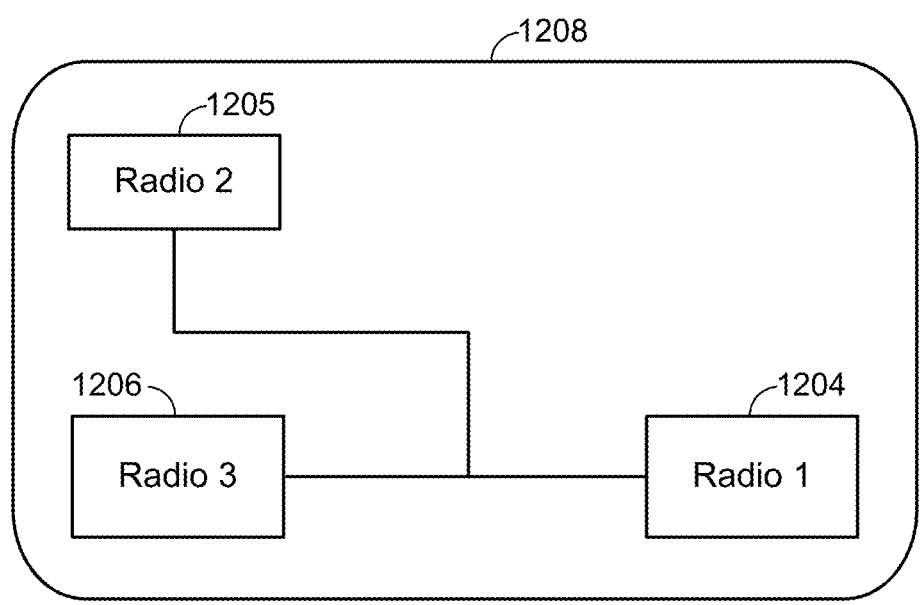

FIG. 12B illustrates another example of a device with two radios using the same RAT. As illustrated in FIG. 12B the device 1208 may include a first radio 1204, such as a modem. The first radio 1204 may also include a GPS or other radio. Additionally, the device 1208 may include a second radio 1205, such as a single chip (SC), that may include a modem for cellular communication on a network, such as 2G, 3G, or LTE, and may also include a WLAN radio. The device 1208 may also include a third radio 1206, such a WLAN radio. In some cases, the third radio 1206 may also include a Bluetooth (BT) radio. In one configuration, the second radio 1205 and third radio 1206 may use the same RAT. Additionally, the RAT of the second radio 1205 and third radio 1206 may be different from the RAT of the first radio 1204. In the present configuration, the second radio 1205 and third radio 1206 may operate on different frequencies, and therefore, the device 1208 may be referred to a dual-band device. Additionally, the device 1208 may be a dual subscriber identity module (SIM) dual active (DSDA) that may include at least two SIM cards with at least two active cellular transmitters.

One Radio of a First RAT Type Operating with Another Radio of a Different RAT Type According to one configuration, a coexistence manager (CxM) may be specified to mitigate the potential interference between a dual-mode RAT, such as a WLAN radio, and another type of RAT, such as an LTE radio. In one configuration, a time-division multiplex operation may be specified for the dual-mode RAT to operate in an access point mode and a station mode by switching between access point/station mode and transmit/receive functions. In this configuration, the radio may operate in a half duplex system such that the transmissions and receptions occur at different times. For example, during one time slot, the radio may be operating in an access point mode and may be receiving information from an external device, such as a UE, and in the next time slot, the radio may be operating in the station mode and may be transmitting information to an external device, such as an access point.

Figure 13:
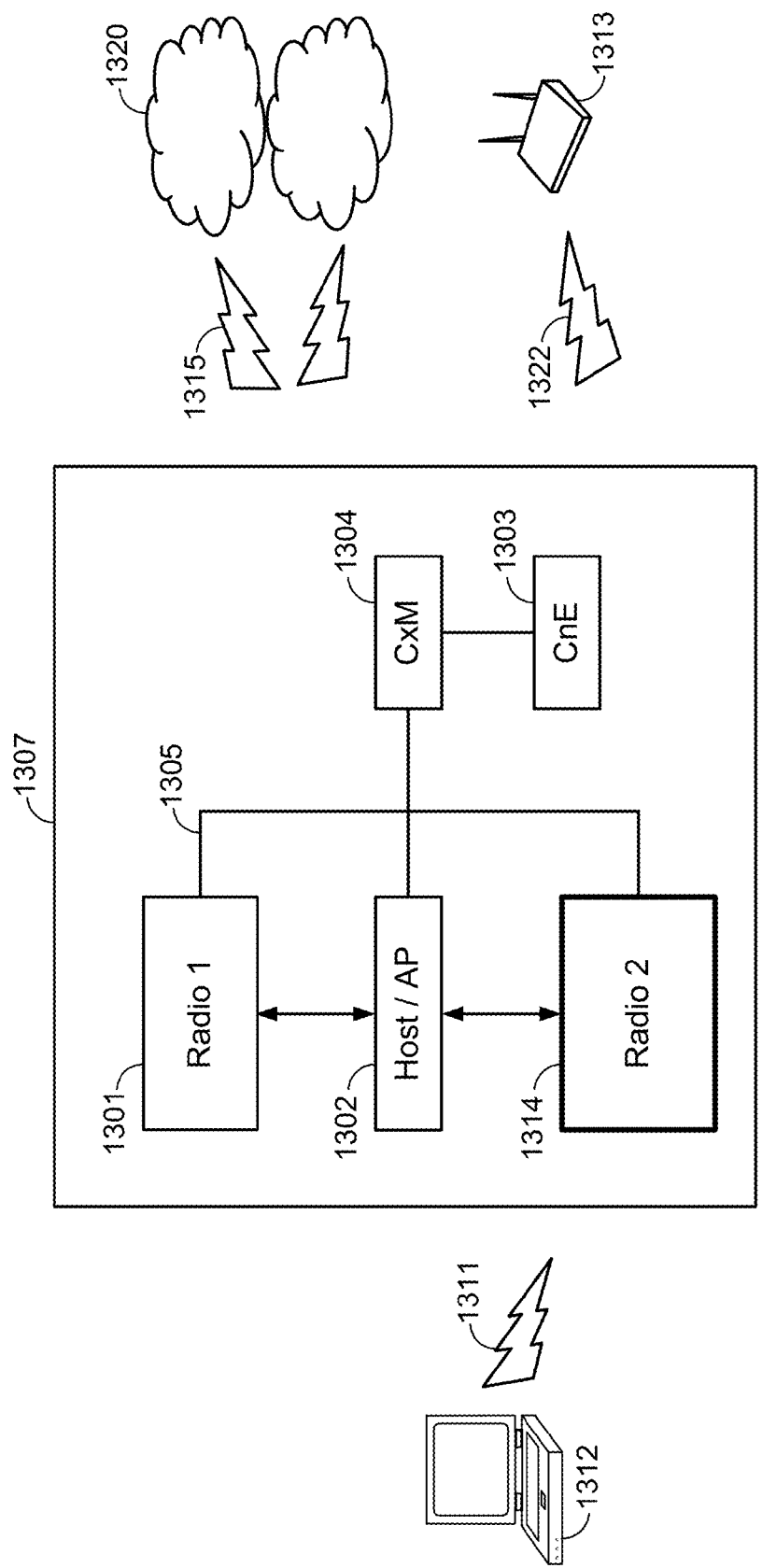
FIG. 13 illustrates an example of a system for providing support within a wireless communication environment for multi-radio coexistence management according to one aspect of the present disclosure.

FIG. 13 illustrates a mobile device with multiple radios operating in a wireless system according to an aspect of the disclosure. As illustrated in FIG. 13, the mobile device 1307 may include a first radio 1301, such as a modem, for cellular communications on a network, such as LTE. The mobile device 1307 may also include a host/application processor module 1302, a coexistence manager 1304, a connectivity engine (CnE) 1303, a coexistence manager interface 1305, and a second radio 1314, such as a single WLAN radio. The second radio 1314 may concurrently operate in an access point mode on first channel and a station mode on a second channel, or on the same channel.

In one configuration, as illustrated in FIG. 13, when operating in the access point mode, the second radio 1314 may service an external device 1312 on a first link 1311 on the first channel. Additionally, when in the station mode, the second radio 1314 may provide a connection with a remote access point 1313 via a second link 1322 on the second channel. The remote AP 1313 may provide access to the Internet. Furthermore, the mobile device 1307 of FIG. 13 may access wireless networks 1320, such as 3GPP or 3GPP2 networks, via wireless links 1315. It should be noted that according to aspects of the disclosure, the first and second channels may be the same or may be different.

In a wireless system, the epochs and durations (which may be referred to as the switching timeframes or event timeframes) for the transmission and reception events, may be controlled, for example, by a device software or an external access point. In a conventional system, the transmission may experience potential interference when a transmission of a first mode, such as a station mode, occurs during reception of a second mode, such as the access point mode. To mitigate the potential interference between the two modes, the coexistence manager may control the switching timeframes so that the transmission and reception time slots of the two modes are at least non-overlapping in time as illustrated in FIG. 14A.

Figure 14A:
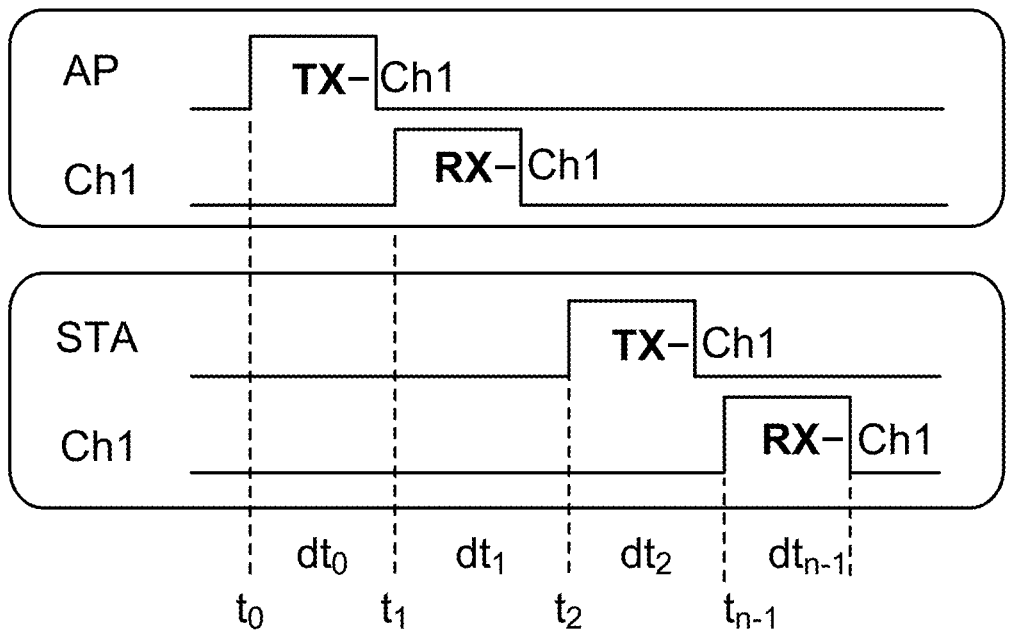
FIGS. 14A and 14B illustrate examples of mitigating interference according to one aspect of the present disclosure.

FIG. 14A illustrates an example of staggered transmission (TX) and reception (RX) time slots for the access point and station modes of a radio. As illustrated in FIG. 14A the access point mode and station mode may operate on the same channel, such as, for example, channel 1. Furthermore, the coexistence manager may control the timing of the uplink and downlink time slots of each mode over event times $t_0$-$t_{n-1}$ and duration times $dt_0$-$dt_{n-1}$ so that the uplink and downlink time slots of the two modes are non-overlapping in time. Although not shown in FIG. 14A, the coexistence manager may control the radio to operate on the same band in each mode or a different band for each mode.

Additionally, in a wireless system, the station frequency channel may be determined by the external access point. The radio may operate at least on a single-band, such as, for example, 2.4 GHz or 5 GHz, a dual-band, such as 2.4 GHz and 5 GHz, or a combination thereof, under dynamic control of a local connectivity engine and a connection manager. A number of predetermined channels may be within each band, such as, for example, channels 1, 6, and 11 on the 2.4 GHz band.

Accordingly, in one configuration, in addition to controlling the event timeframes, the coexistence manager may also control the device to negotiate a station frequency channel between the radio and the external access point. This may be similar to a WWAN system that may permit a UE to negotiate a change in operator channel based at least on the UE's poor coexistence state. Alternatively, when the radio is operating in the access point mode, the frequency channel may be determined by the software of the radio or may be under control of the coexistence manager and the connectivity engine.

Figure 14B:
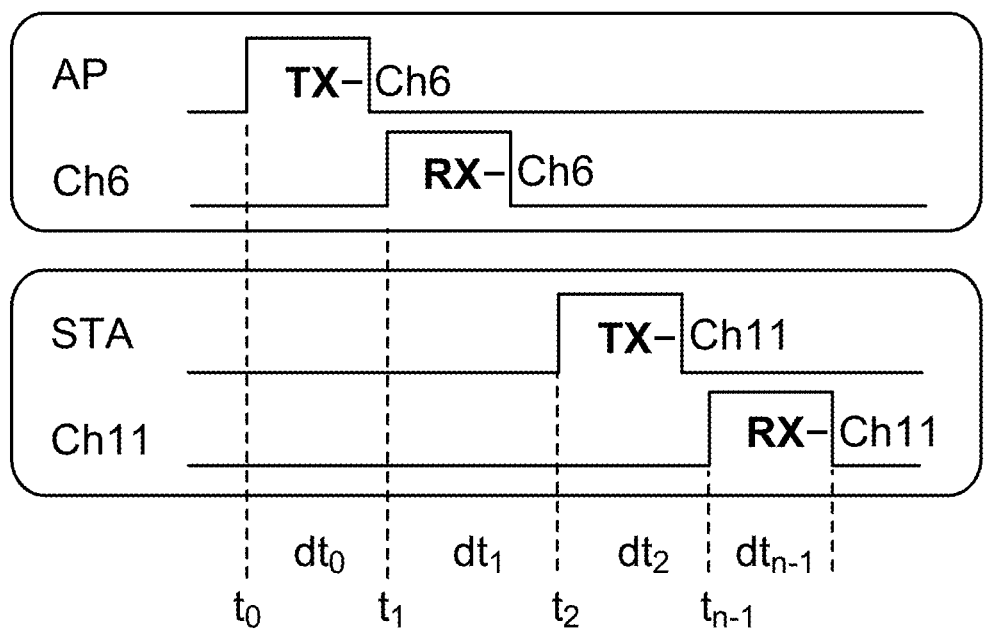

Thus, in one configuration, when the radio is operating in either the access point mode or the station mode and also operating in either a single-band or dual-band, the coexistence manager may control the radio to switch between a first channel and a second channel according to an operating mode. That is, as illustrated in FIG. 14B, the coexistence manager may control the radio to switch between the access point and station modes, an uplink and a downlink, and a first channel and second channel. The radio may operate in the time-division multiplex mode to enable time slot separation to mitigate a potential interference on the operating channels.

FIG. 14B illustrates an example of staggered transmission (TX) and reception (RX) time slots for the access point and station modes of a single radio. As illustrated in FIG. 14B, an access point may operate on a first channel, such as, for example, channel 6, and a station may operate on a second channel, such as, for example, channel 11. In this configuration, the second channel is different from the first channel. Furthermore, the coexistence manager may control the timing of the transmission and reception time slots of each mode over event times $t_0$-$t_{n-1}$ and duration times $dt_0$-$dt_{n-1}$ such that the transmission and reception time slots of the two modes are non-overlapping in time. Although not shown in FIG. 14B, the coexistence manager may control the radio to operate on the same band in each mode or a different band for each mode.

At Least Two RATs Having the Same Type and One Different Type of RAT

According to another configuration, a coexistence manager may be specified to mitigate potential interference between two radios of the same RAT operating on a single device.

In a conventional wireless device, each radio may operate in a time-division multiplex half duplex manner so that the transmission and reception operations are displaced in time. That is, the transmission and reception operations are non-overlapping. However, a potential interference may occur when two radios operating with the same RAT are defined within a single device and a transmission of a first radio overlaps a reception of a second radio.

Figure 15:
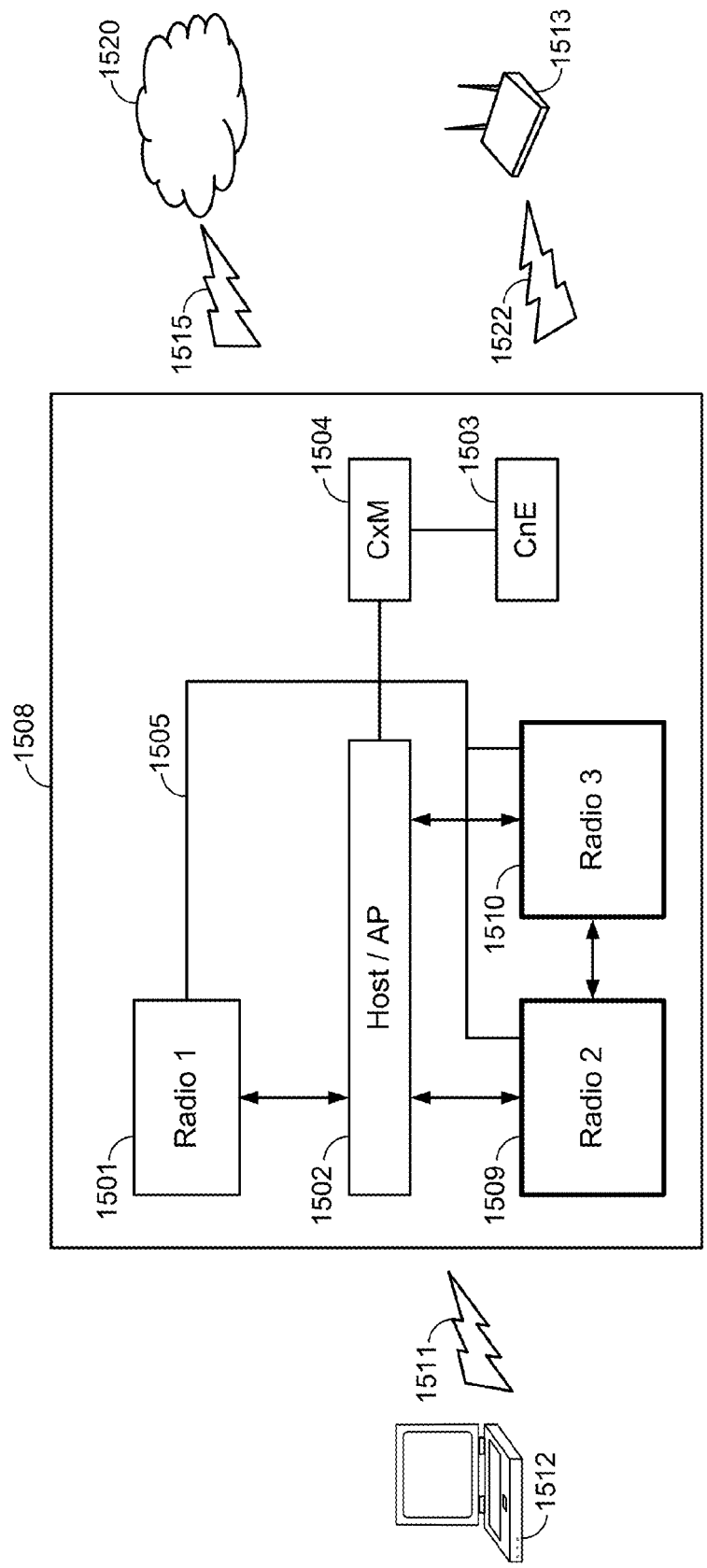
FIG. 15 illustrates an example of a system for providing support within a wireless communication environment for multi-radio coexistence management according to one aspect of the present disclosure.

Specifically, for example, a first radio may be configured to operate in an access point mode and a second radio may be configured to operate in a station mode. The first radio and second radio are of the same RAT, for example, the first radio and second radio may both be WLAN radios. FIG. 15 illustrates an example of a mobile device with two radios using the same RAT according to an aspect of the present disclosure.

As illustrated in FIG. 15, a one radio may be configured to operate in an access point mode and another radio may be configured to operate in a station mode. The mobile device 1508 of FIG. 15 may include a first radio 1501 for cellular communications on a network, such as LTE. The mobile device may also include a host/application processor module 1502, a coexistence manager 1504, a connectivity engine 1503, a coexistence manager interface 1505, and a second radio 1509 and a third radio 1510. The coexistence manager 1504 may operate similar to the coexistence manager 640 discussed above. The second radio 1509 may operate in a dedicated access point mode on a first channel and the third radio 1510 may operate in a dedicated station mode on a second channel. The second radio 1509 and third radio 1510 use same RAT, that is, for example, the second radio 1509 and third radio 1510 may both be WLAN radios.

Furthermore, as illustrated in FIG. 15, the second radio 1509 may service an external device 1512 on a first link 1511 on the first channel. Additionally, the third radio 1510 may provide a connection with a remote access point 1513 via a second link 1522 on the second channel. The remote access point 1513 may provide access to the Internet. Furthermore, the mobile device 1508 of FIG. 15 may access networks 1520, such as 3GPP or 3GPP2 networks, via links 1515. It should be noted that according to aspects of the disclosure discussed below, the first and second channels may be the same or may be different. Additionally, in this example, radios 1509, 1510 may operate in the same or different bands, e.g. 2.4 GHz and 5 GHz.

A radio, such as a WLAN radio, may operate in a time-division multiplex half-duplex manner so that the uplink and downlink time slots are non-overlapping. However, when a device includes two or more radios of the same RAT, the events of one radio may overlap with an event of another radio, thus resulting in a potential interference.

In an aspect of the present disclosure, to mitigate a potential interference, the coexistence manager may control the timing of each radio so that the transmission and reception events of each radio are non-overlapping in time with transmission and reception events of the others radios operating on the same device when in the same band.

Figure 16:
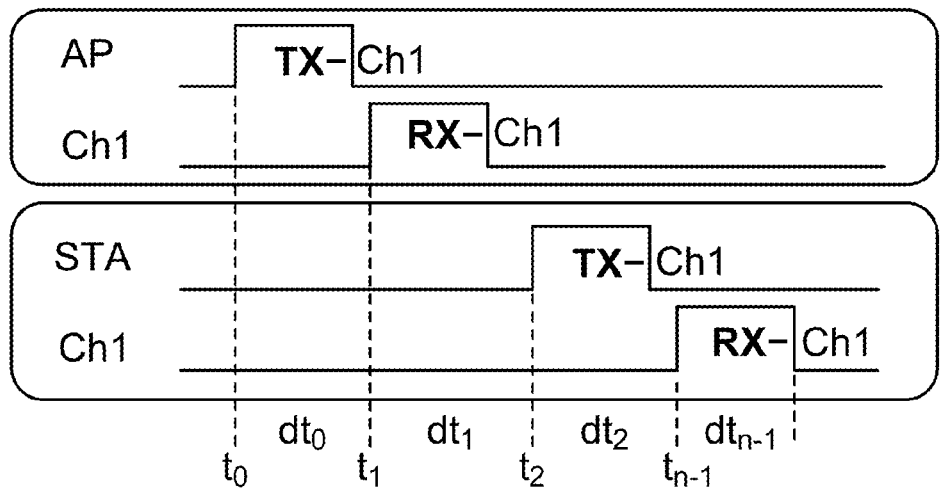
FIG. 16 illustrates an example of mitigating interference according to one aspect of the present disclosure.

For example, as illustrated in FIG. 16, a first radio may be configured to operate in an access point mode on a first channel, such as, for example, channel 1. Additionally, a second radio may be configured to operate in an station mode on the first channel. As shown in FIG. 16, the coexistence manager may control the timing of the transmission and reception time slots of each radio over event times $t_0$-$t_{n-1}$ and duration times $dt_0$-$dt_{n-1}$ so that the transmission and reception time slots of each radio are non-overlapping in time. Although not shown in FIG. 16, the coexistence manager may control the radios to operate on the same band in each mode or a different band for each mode.

When a radio is operating in a station mode, the channel frequency and band may be determined by the external access point. Additionally, when a radio is operating in an access point mode, the channel frequency and band may be determined by the radio. Generally, when at least two radios of the same RAT are operating on the same device, the radios operate on different bands because simultaneous operation of multiple radios on the same band may result in a potential interference regardless of if the transmission and reception operations are on different channels. Nonetheless, as described herein, in one configuration, the radios may operate in the same band with TDM coordination.

Figure 17:
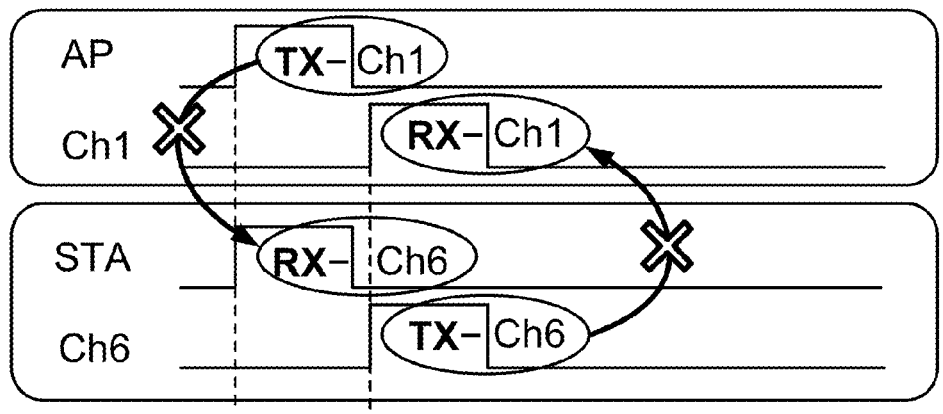
FIG. 17 illustrates an example of prior art system that does not mitigate interference.

FIG. 17 illustrates an example of simultaneous transmit and receive operations on two channels, such as, for example, channel 1 and channel 6. The channels of the system of FIG. 17 use the same band, such as, for example, 2.4 GHz, resulting in a full desense at the receive side (indicated by the "X" marks) that may be independent of channel separation.

According to an aspect of the present disclosure, under control of a coexistence manager the two radios of the same RAT may operate on at least different bands and different channels, the same band and different channels, or the same band and same channel.

Accordingly, in the present configuration, the coexistence manager may mitigate potential interference by controlling the timing of each radio to prevent an overlap between transmission and reception operations of each radio. Furthermore, according to another configuration the coexistence manager may also control the band or channel frequency of each radio in addition to controlling the timing of the transmission/reception operations of each radio. Furthermore, according to still another configuration, the coexistence manager may also control transmission power levels of each radio, and other factors that may mitigate potential interference between the radios.

Figure 18:
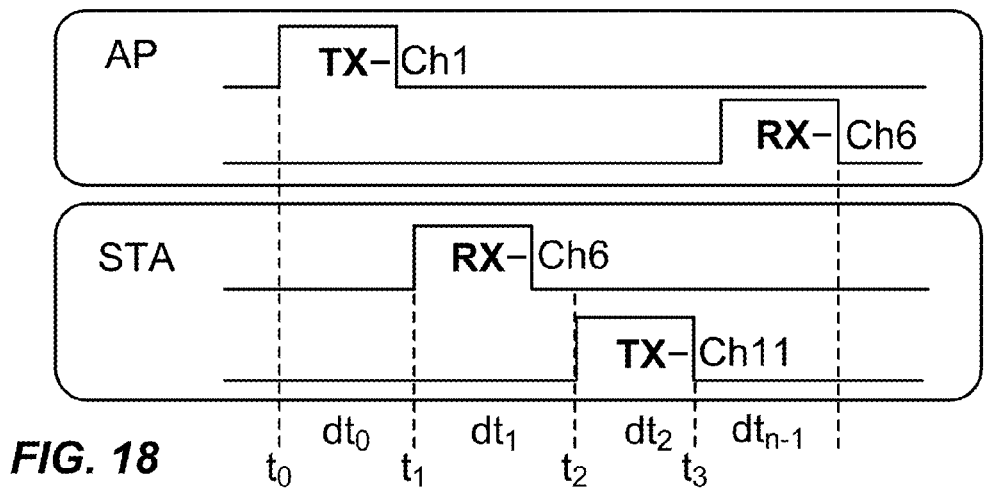
FIG. 18 illustrates an example of mitigating interference according to one aspect of the present disclosure.

As illustrated in FIG. 18, a first radio may be configured to operate in an access point mode and a second radio may be configured to operate in a station mode. In this example, the coexistence manager may control the timing of the transmission and reception time slots of each radio over event times $t_0$-$t_{n-1}$ and duration times $dt_0$-$dt_{n-1}$ so that the transmission and reception time slots of each of the radios are non-overlapping in time. Furthermore, the coexistence manager may control each radio to operate on different channels, such as, for example, channels 1, 6, and 11, during a transmission and a reception.

For example, under control of the coexistence manager, the radio operating in the access point mode may operate on channel 1 for transmissions and channel 6 for receptions. Additionally, under control of the coexistence manager, as an example, the radio operating in the station mode may operate on channel 6 for receptions and channel 11 for transmissions. Although not shown in FIG. 18, the coexistence manager may control the radios to operate on the same band in each mode or a different band for each mode.

Furthermore, as illustrated in FIG. 18, it should be noted that the transmissions and receptions of each radio may not be consecutive. For example, the coexistence manager may schedule a transmission for the access point, a reception for the station, an transmission for the station, and finally a reception for the access point. Furthermore, the radios described for FIGS. 16-18 may have the same RAT.

The solutions described herein may mitigate potential interference in various devices that include two or more radios of a first RAT type. In this example, the first radio may operate in an access point mode such that external devices may obtain WiFi access via the first radio, and the second radio may operate in a station mode such that the device may connect to an external access point. That is, by controlling the timing operations of the two radios, the two radios may simultaneously operate on the same device. Furthermore, the controlled timing specifies for the two radios to use a dual-mode operation (station mode and access mode) without interference. Finally, the controlled timing may also allow for the two radios to operate in different bands.

The timing and/or band operation of the radios may be controlled based on various conditions and/or requirements. The requirements may include, but are not limited to, priority, throughput, and latency. Conditions may include, but are not limited to, a battery state of the mobile device, power consumption, and/or operating condition. For example, different bands may have different battery consumptions, and therefore, the coexistence manager may control the timing and/or band operation of each radio based on the battery consumption of a specific band.

Furthermore, the coexistence manager may be configured to mitigate a potential interference between the first radio of a first RAT and a second radio of a second RAT so that the first radio and second radio may operate concurrently. Finally, the coexistence manager may be configured to mitigate a potential interference between the first radio and second radio of the same RAT described in the example above and a third radio of a different RAT.

It should be noted that the coexistence manager may mitigate other types of potential interference in addition to the potential interference scenarios described herein. For example, the coexistence manager may mitigate potential interference on a device with a single WLAN radio, or chip, and other co-located radios, such as an LTE radio. As another example, the coexistence manager may mitigate potential interference on a device with at least two WLAN radios, or chips, and other co-located radios, such as an LTE radio. Thus, the solutions described herein may be incorporated on their own or together, and may be combined in whole or in part with those discussed in co-owned patent application Ser. No. 12/549,651, filed Aug. 28, 2009 in the names of WIETFELDT et al., co-owned patent application Ser. No. 12/549,678, filed Aug. 28, 2009 in the names of WIETFELDT et al., co-owned patent application Ser. No. 12/822,026, filed Jun. 23, 2010 in the names of WIETFELDT et al., co-owned patent application Ser. No. 13/074,886, filed Mar. 29, 2011 in the names of CHRISIKOS et al., and co-owned patent application Ser. No. 13/074,913, filed Mar. 29, 2011 in the names of CHRISIKOS et al. which are hereby expressly incorporated by reference in their entireties.

It should also be noted that the solutions and aspects described in the disclosure are not limited to mitigating potential interference on a single WLAN radio, or chip, operating in at least two modes, or co-located WLAN radios, or chips. Specifically, the solutions and aspects described in the disclosure may be applicable to devices with a single radio operating in dual modes, or at least two co-located radios, such as a Bluetooth radio or co-located Bluetooth radios.

Furthermore, the solutions and configurations described in this disclosure are not limited to a device having co-located WLAN radios. Specifically, the co-located radios may be of any RAT, or any RAT that may operate in dual modes. For example, the co-located radios may be LTE radios, or in another example, one radio may be an LTE radio and another radio may be a WCDMA radio.

In one aspect, an LTE radio may operate in a client mode slaved to the LTE Base Station (e.g., master). In another aspect, one LTE radio may operate as a "master" communicating with one or more LTE "slaves" independent from the Base Station. Both LTE modes may concurrently operate. The concurrent operation may be substantially similar to the aforementioned WLAN dual mode operation (e.g., STA and AP modes). Thus, as previously discussed, the solutions and configurations described in this disclosure may be applicable to the operation of dual LTE radios in a single device. Similar multi-mode operation may be possible with other RAT types as well.

As shown in FIG. 19 a UE may identify a first radio operating in an first mode and a second radio operating in a second mode defined within one device as shown in block 1902. The first radio and the second radio are of the same RAT and may also operate on the same band. Additionally, a UE may alter a communication time of the first radio and/or the second radio to reduce interference as shown in block 1904.

Figure 20:
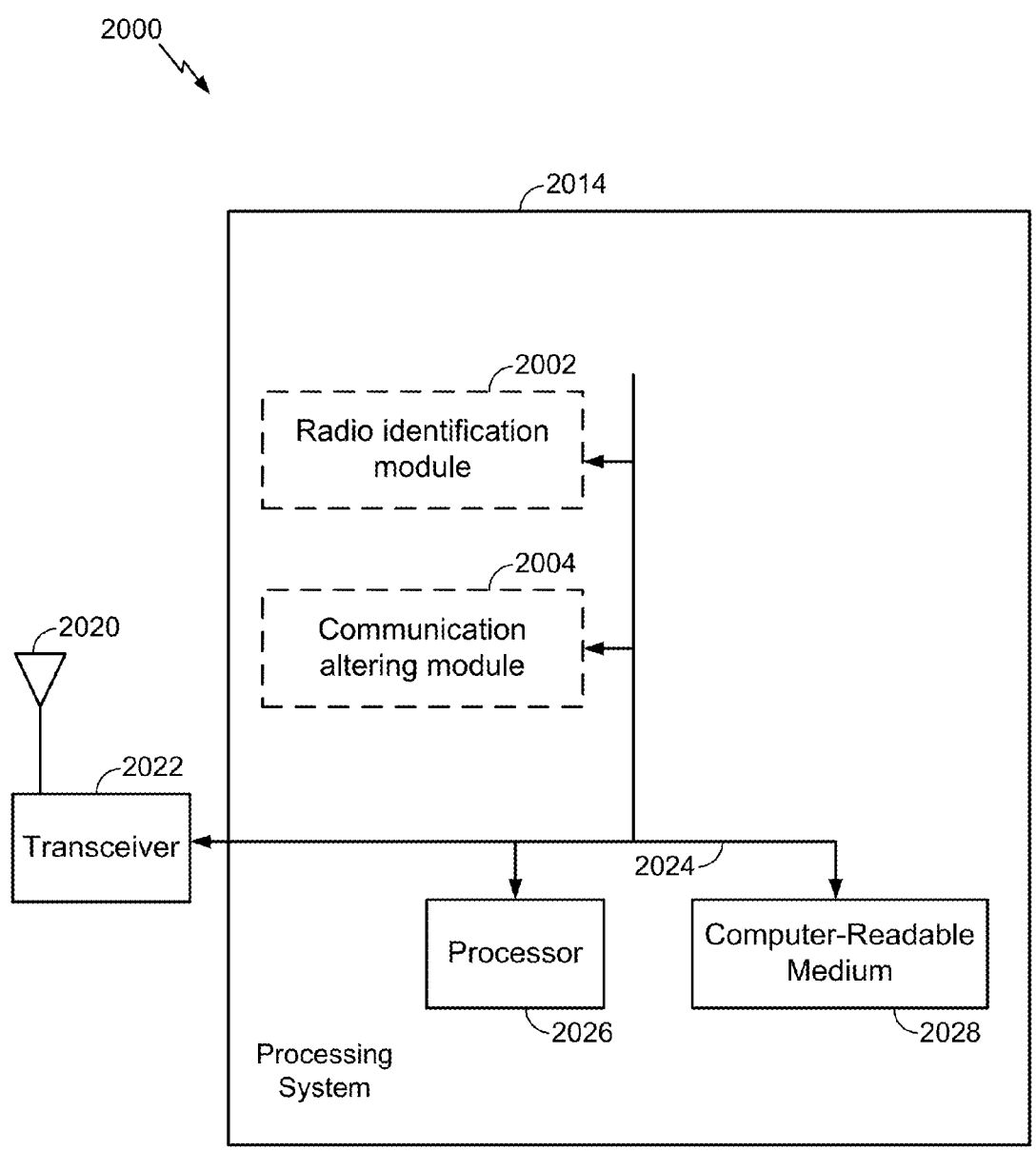
FIG. 20 is a diagram illustrating an example of a hardware implementation for an apparatus employing components for mitigating interference.

FIG. 20 is a diagram illustrating an example of a hardware implementation for an apparatus 2000 employing a co-existence mitigation system 2014. The co-existence mitigation system 2014 may be implemented with a bus architecture, represented generally by a bus 2024. The bus 2024 may include any number of interconnecting buses and bridges depending on the specific application of the co-existence mitigation system 2014 and the overall design constraints. The bus 2024 links together various circuits including one or more processors and/or hardware modules, represented by a processor 2026, an radio identification module 2002, a communication altering module 2004, and a computer-readable medium 2028. The bus 2024 may also link various other circuits such as timing sources, peripherals, voltage regulators, and power management circuits, which are well known in the art, and therefore, will not be described any further.

The apparatus includes the co-existence mitigation system 2014 coupled to a transceiver 2022. The transceiver 2022 is coupled to one or more antennas 2020. The transceiver 2022 provides a means for communicating with various other apparatus over a transmission medium. The co-existence mitigation system 2014 includes the processor 2026 coupled to the computer-readable medium 2028. The processor 2026 is responsible for general processing, including the execution of software stored on the computer-readable medium 2028. The software, when executed by the processor 2026, causes the co-existence mitigation system 2014 to perform the various functions described supra for any particular apparatus. The computer-readable medium 2028 may also be used for storing data that is manipulated by the processor 2026 when executing software. The co-existence mitigation system 2014 further includes the radio identification module 2002 for identifying a first radio operating in an first mode and a second radio operating in a second mode defined within one device, and the communication altering module 2004 for altering a communication time of the first radio and/or the second radio to reduce interference. The interference determination module 2002 and the communication altering module 2004 may be software modules running in the processor 2026, resident/stored in the computer-readable medium 2028, one or more hardware modules coupled to the processor 2026, or some combination thereof. The co-existence mitigation system 2014 may be a component of the UE 250 and may include the memory 272 and/or the processor 270.

In one configuration, the apparatus 2000 for wireless communication includes means for identifying and means for altering. The means may be the radio identification module 2002, the communication altering module 2004, coexistence manager 640, processor 230/270, memory 232/272, antenna 224/252, antenna 1220, transceiver 1222, processor 1226, computer readable medium 1228, and/or the co-existence mitigation system 1214 configured to perform the functions recited by the means. In another aspect, the aforementioned means may be any module or any apparatus configured to perform the functions recited by the aforementioned means.

The examples above describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
    identifying, at a first wireless device, a first radio operating in a station mode to communicate with a remote access point while a second radio operates in an access point mode to serve as an access point for a second wireless device, the first radio having a first transmit/receive chain and the second radio having a second transmit/receive chain that is different from the first transmit/receive chain such that information from transmissions/receptions of the first radio is different in comparison to information from transmissions/receptions of the second radio, and the first radio and the second radio are operating in different end-to-end communication links;

identifying, at the first wireless device, the second radio operating in the access point mode while the first radio operates in the station mode, the first radio and second radio being defined within one device, the first radio and the second radio operating on a same radio access technology (RAT) and also operating on a same band; and altering a communication of the first radio and/or the second radio to reduce interference.

2. The method of claim 1, in which the altering comprises altering communications of the first radio to be non-overlapping in time with communications of the second radio.

3. The method of claim 1, further comprises altering the band of the first radio to be different from the band of the second radio.

4. The method of claim 1, in which the altering comprises altering the communication of a third radio operating on a RAT that is different from the RAT of the first and second radio.

5. An apparatus for wireless communications, comprising:

means for identifying, at a first wireless device, a first radio operating in a station mode to communicate with a remote access point while a second radio operates in an access point mode to serve as an access point for a second wireless device, the first radio having a first transmit/receive chain and the second radio having a second transmit/receive chain that is different from the first transmit/receive chain such that information from transmissions/receptions of the first radio is different in comparison to information from transmissions/receptions of the second radio, and the first radio and the second radio are operating in different end-to-end communication links;

means for identifying, at the first wireless device, the second radio operating in the access point mode while the first radio operates in the station mode, the first radio and second radio being defined within one device, the first radio and the second radio operating on a same radio access technology (RAT) and also operating on a same band; and means for altering a communication of the first radio and/or the second radio to reduce interference.

6. The apparatus of claim 5, in which the means for altering comprises means for altering communications of the first radio to be non-overlapping in time with communications of the second radio.

7. The apparatus of claim 5, further comprises means for altering the band of the first radio to be different from the band of the second radio.

8. The apparatus of claim 5, in which the means for altering comprises means for altering the communication of a third radio operating on a RAT that is different from the RAT of the first and second radio.

9. A non-transitory computer-readable medium having program code recorded thereon for wireless communication, the program code comprising:

program code to identify, at a first wireless device, a first radio operating in a station mode to communicate with a remote access point while a second radio operates in an access point mode to serve as an access point for a second wireless device, the first radio having a first transmit/receive chain and the second radio having a second transmit/receive chain that is different from the first transmit/receive chain such that information from transmissions/receptions of the first radio is different in comparison to information from transmissions/receptions of the second radio, and the first radio and the second radio are operating in different end-to-end communication links;

program code to identify, at the first wireless device, the second radio operating in the access point mode while the first radio operates in the station mode, the first radio and second radio being defined within one device, the first radio and the second radio operating on a same radio access technology (RAT) and also operating on a same band; and program code to alter a communication of the first radio and/or the second radio to reduce interference.

10. The non-transitory computer-readable medium of claim 9, in which the program code to alter further comprises program code to alter communications of the first radio to be non-overlapping in time with communications of the second radio.

11. The non-transitory computer-readable medium of claim 9, further comprises program code to alter the band of the first radio to be different from the band of the second radio.

12. The non-transitory computer-readable medium of claim 9, in which the program code to alter further comprises program code to alter the communication of a third radio operating on a RAT that is different from the RAT of the first and second radio.

13. An apparatus for wireless communications, comprising:

a memory; and at least one processor coupled to the memory, the at least one processor being configured:

to identify, at a first wireless device, a first radio operating in a station mode to communicate with a remote access point while a second radio operates in an access point mode to serve as an access point for a second wireless device, the first radio having a first transmit/receive chain and the second radio having a second transmit/receive chain that is different from the first transmit/receive chain such that information from transmissions/receptions of the first radio is different in comparison to information from transmissions/receptions of the second radio, and the first radio and the second radio are operating in different end-to-end communication links;

to identify, at the first wireless device, the second radio operating in the access point mode while the first radio operates in the station mode, the first radio and second radio being defined within one device, the first radio and the second radio operating on a same radio access technology (RAT) and also operating on a same band; and to alter a communication of the first radio and/or the second radio to reduce interference.

14. The apparatus of claim 13, in which the at least one processor is further configured to alter communications of the first radio to be non-overlapping in time with communications of the second radio.

15. The apparatus of claim 13, in which the at least one processor is further configured to alter the band of the first radio to be different from the band of the second radio.

16. The apparatus of claim 13, in which the at least one processor is further configured to alter the communication of a third radio operating on a RAT that is different from the RAT of the first and second radio.

* * * * *